Oct. 20, 1964
N. NELSSON ETAL
3,153,467
MEANS FOR POSITIONING THE SUPPORTING
MEMBERS IN A WALL CONSTRUCTION
Filed Feb. 17, 1961
2 Sheets-Sheet 1
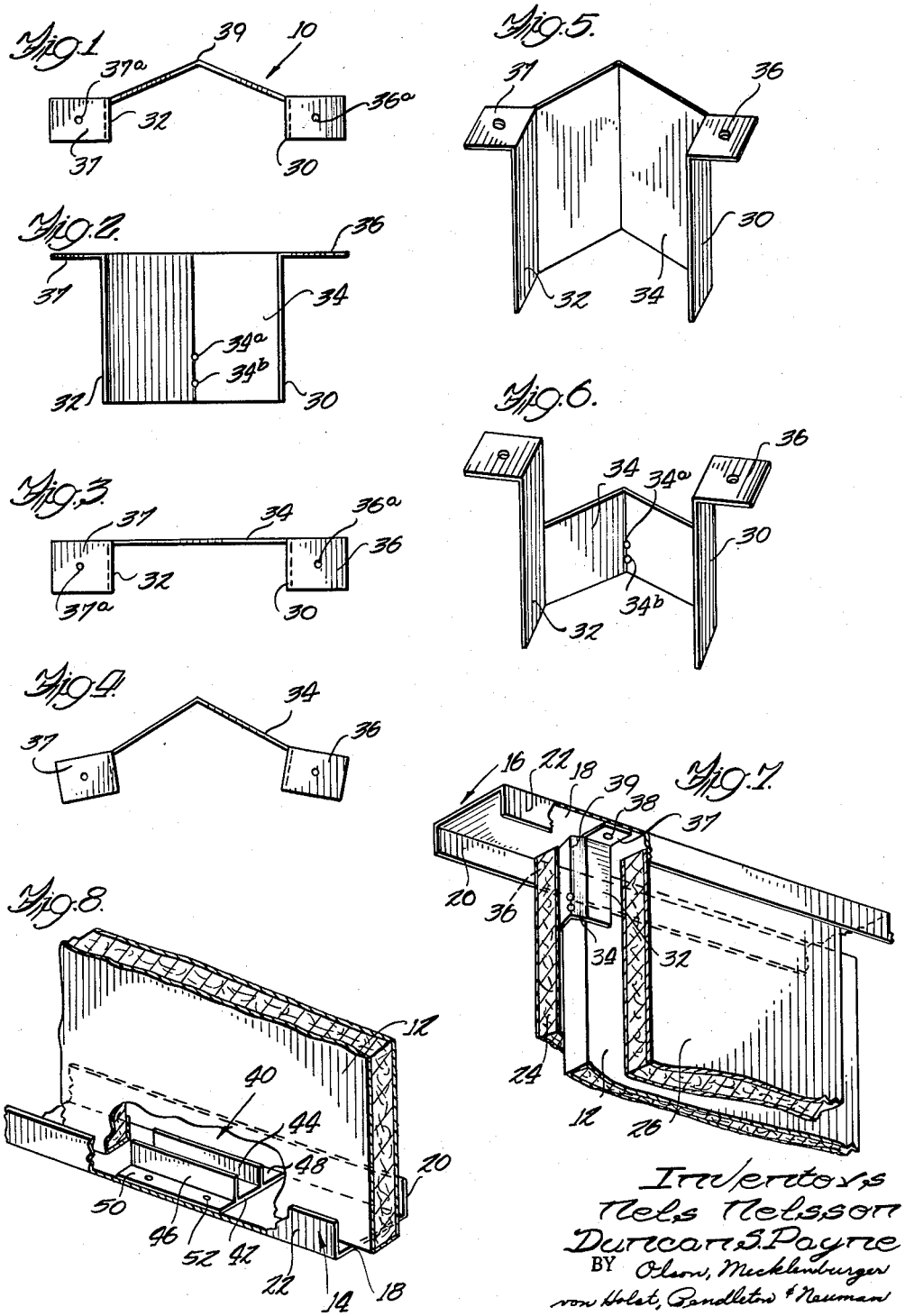

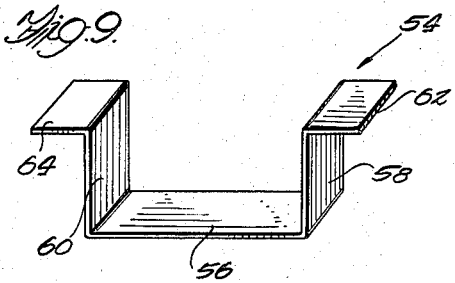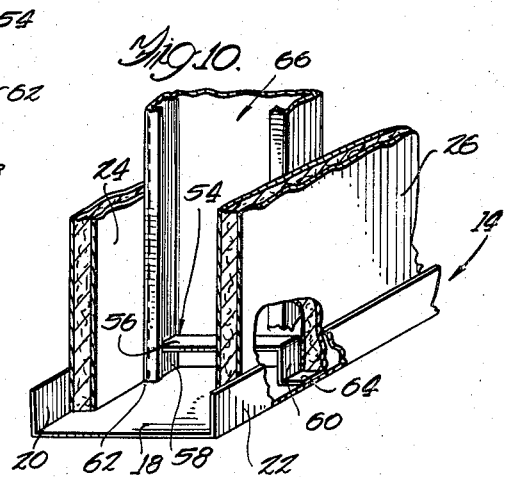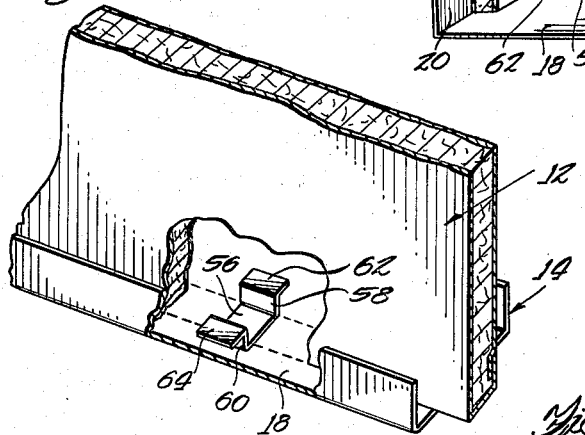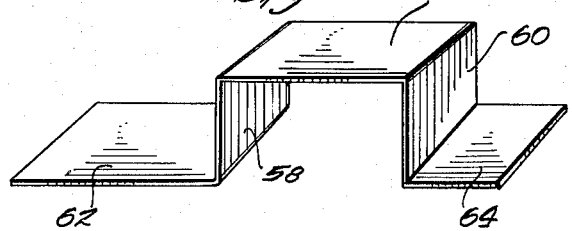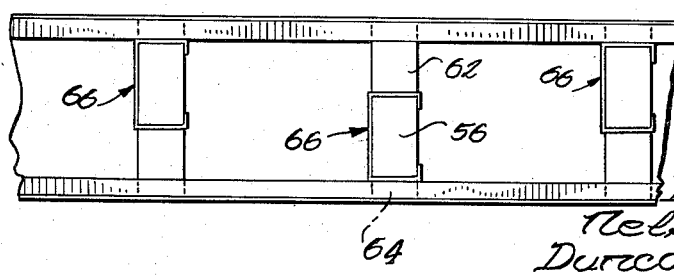

3,153,467
Patented Oct. 20, 1964

3,153,467
MEANS FOR POSITIONING THE SUPPORTING MEMBERS IN A WALL CONSTRUCTION
Nels Nelsson, Des Plaines, and Duncan S. Payne, Chicago, Ill., assignors to United States Gypsum Company, Chicago, Ill., a corporation of Illinois
Filed Feb. 17, 1961, Ser. No. 90,066
11 Claims. (Cl. 189—34)

This invention relates to a wall construction and more particularly to means for properly positioning the supporting members in a wall construction. The invention is adapted for use in connection with the construction of either solid or hollow non-load bearing partition systems.

In the installation of a solid non-load bearing dry wall partition system wherein the support members are wallboard core units or panels, it has heretofore been common practice to laminate the face or finish layers to the core panels prior to positioning the core panels. Such laminated structures are, however, very heavy and awkward to handle and erect. In addition, the installation of each laminated composite unit is a time-consuming operation, since each composite unit has to be accurately cut and placed so that the ends thereof are properly located against the ceiling and floor, and so that all of the composite units are properly aligned.

Various suggestions for the lamination of the face layers to the core panels after the latter have been fixed in position have not, however, been completely satisfactory, since the core units still have to be accurately cut and positioned prior to the application of the face layers.

Hollow non-load bearing partition systems are commonly constructed using sheet metal channel studs as the support members. The face layers are then usually attached directly to the studs by self-tapping screws or the like. Here again, the proper placement and alignment of the studs between the ceiling and floor has heretofore been a time-consuming operation, requiring the accurate cutting of the studs in order to properly locate the ends thereof against the ceiling and floor or against runners which may be attached to the ceiling and floor. Also, the studs have to be carefully aligned before the face layers are attached.

One object of this invention is to provide a device which will properly position the support units of a wall construction so that the face layers may be attached thereto.

It is another object of this invention to provide a device which will effect a proper positioning of the support members between the floor and ceiling in a wall construction without requiring the accurate cutting and fitting of the members.

Another object of this invention is to provide a device for facilitating the installation of a solid non-load bearing, dry wall partition system in an economical and efficient manner.

It is a further object of this invention to provide a core spacer clip which will properly position the core units between the floor and ceiling in the construction of a solid non-load bearing dry wall partition system and will insure accurate alignment and mating of the tongue and groove edges of adjacent core units.

It is still another object of this invention to provide a spacer clip which will properly position a hollow stud between floor and ceiling in the construction of a hollow non-load bearing partition system.

It is still another object of this invention to provide a device which will properly position and align the hollow stud members between the floor and ceiling of a hollow non-load bearing partition system so that panel face layers may be attached thereto.

Still another object of this invention is to provide a spacer clip which may be used alternatively either to position the core panel between the floor and ceiling in the construction of a solid non-load bearing partition system or to position the hollow studs between the floor and ceiling in the construction of a hollow non-load bearing partition system.

Other objects will be seen, and a fuller understanding of the invention may be had by referring to the following description and claims taken in conjunction with the accompanying drawings.

The invention is particularly adapted for use in a wall construction having a plurality of elongate support members to which are attached facing layers. One embodiment of the invention comprises a channel-shaped runner having a flat base and a pair of substantially parallel side pieces extending transversely therefrom. The support members are transversely disposed with respect to the base of this runner and have portions thereof extending at least partially into the space between the side pieces of the runner. A clip is provided having an interiorly disposed portion in operative interfitting engagement with the support member portion, and a pair of spacing elements integral with this interiorly disposed portion of the clip extend outwardly in opposite directions therefrom to define the respective opposing end limits of the clip. The distance between the distal ends of the spacing elements is substantially equal to the spacing between the parallel side pieces of the runner; and, thus, the clip may effectively position the portion of the support member between the side pieces of the runner.

With reference to the drawings:

FIGURE 1 is a top plan view of the spacer clip constructed in accordance with one embodiment of the invention;

FIG. 2 is a side elevation view of the clip illustrated in FIG. 1;

FIG. 3 is a top plan view of a slightly modified spacer clip;

FIG. 4 is a top plan view of a clip incorporating another modification;

FIG. 5 is a perspective view of the clip illustrated in FIG. 4;

FIG. 6 is a perspective view of another slightly modified clip;

FIG. 7 is a fragmentary perspective view of a portion of a solid non-load bearing partition system showing a cealing runner and a clip constructed in accordance with this invention;

FIG. 8 is a fragmentary perspective view of a portion of a solid non-load bearing partition system illustrating a floor runner and a clip constructed in accordance with this invention;

FIG. 9 is a perspective view of a further modification of the clip constructed in accordance with this invention;

FIG. 10 is a fragmentary perspective view of a portion of a hollow non-load bearing partition system showing the interrelationship between the clip illustrated in FIG. 9 and a floor runner;

FIG. 11 is a fragmentary perspective view of a portion of a solid non-load bearing partition system in which the floor runner and clip illustrated in FIG. 10 are used;

FIG. 12 is a perspective view of a slightly modified clip; and

FIG. 13 is a top plan view of a hollow non-load bearing wall construction illustrating the manner in which the modified clip of FIG. 12 may be employed therewith.

The clips 10 illustrated in FIGS. 1 through 6 are adapted to be used in a solid non-load bearing wall or partition system in the manner illustrated in FIG. 7. The partition system, only a portion of which is illustrated herein, is formed of a plurality of core panels 12 which are arranged in edge-to-edge relationship and span the distance between the floor runner 14 (see FIG. 8) and the ceiling runner 16 (see FIG. 7). The floor and ceiling runners 14 and 16 are identically constructed each being substantially channel-shaped and including a flat base 18 and a pair of substantially parallel side pieces or flanges 20 and 22. The core panel 12 is to be positioned within the floor and ceiling runners 14 and 16 so that the facing layers 24 and 26 may be applied thereto to form the finished wall. Therefore, the core panel 12 must be accurately positioned and aligned within the floor and ceiling runners 14 and 16. Previously, this required great care and the core panels had to be accurately cut in order to properly locate the top edge thereof within the ceiling runner 16.

The clip 10 eliminates the necessity for accurate cutting of the core panels 12 and may be used at both the ceiling and the floor to insure the accurate positioning of the core panels. This clip includes a pair of spaced side plates 30 and 32 which are interconnected by means of a transverse intermediate web 34. The height of the side plates 30 and 32 is substantially greater than the height of the side pieces 20 and 22 of the floor and ceiling runners. As will be seen, this feature permits the clip to accurately position and align the core panels with respect to the runners even though the core panel may be inaccurately cut. Connected to the top of side plate 30 and extending perpendicularly outwardly therefrom is a planar tab 36, and a similar tab 37 is connected to the top of side plate 32 and extends perpendicularly outwardly therefrom. The tabs 36 and 37 are coplanar and are adapted to flatly engage the base 18 of the corresponding runner and to be attached thereto by penetrating fasteners such as nails or screws 38 which extend therethrough into the ceiling or the floor as the case may be. For this purpose, these tabs may be provided with apertures 36a and 37a.

The clip is adapted to accommodate the core panel 12 between its side plates with the intermediate web 34 extending about the adjacent vertical edge of the core panel, as illustrated in FIG. 7. In the clips illustrated in FIGS. 1, 2, and 3, the side plates 30 and 32 are substantially parallel and the spacing is substantially equal to the spacing between the side surfaces of the panel 12. If desired, however, the web 34 of the clip may be bent to a greater degree and will act as a spring, the normal or relaxed position of which causes the side plates 30 and 32 to assume a relatively angular position, as illustrated in FIGS. 4, 5, and 6. In this relaxed position of the resilient interconnecting web 34, the spacing between the side plates 32 and 34 is slightly less than the spacing between the side surfaces of the core panel 12, and the clip is attached to the core panel by springing these side plates apart and permitting them to snap onto the core panel. Thus, the clips illustrated in FIGS. 4, 5, and 6 may be positioned on the core panel before the core panel is mounted in place within the ceiling runner 16.

The clips illustrated in FIGS. 1, 2, 4, 5, and 6 as well as in FIG. 7 are adapted for tongue-and-groove arrangement of the core panels 12. It will be noted that the web is longitudinally bent to form a central bight 39. This web will thus extend about the tongue of the core panel 12 to which it is attached, and the core panel 12 with the connecting web of the clip extending thereabout will fit within the groove of the immediately adjacent core panel (not illustrated) without interference by the clip. If desired, the web may be provided with apertures 34a and 34b as best illustrated in FIGS. 2 and 6, and penetrating fasteners may extend through these apertures in the web into the core panel 12 to firmly attach the clip to the core panel.

The clip illustrated in FIG. 3 is adapted to be used in connection with core panels which are not tongue-and-grooved, and it will be noted that the connecting web 34 is flat. It is apparent that the connecting web 34 may be made to fit the edge contour of any core panel. In the clip illustrated in FIG. 6, the connecting web 34 is not longitudinally coextensive with the side plates 30 and 32, but rather is spaced below the plane of the tabs 36 and 37. This clip is especially adapted for use at the ceiling and provides a raceway through the partition system for the accommodation of plumbing pipes, electrical wires or the like.

The side plates 30 and 32 are substantially longer than the side pieces 20 and 22 of the ceiling runner 16. Thus, the core panel 12 will be firmly engaged by the clip 10 even though it may not be quite long enough to extend from the floor runner 14 to between the side pieces 20 and 22 of the ceiling runner. Thus, the clip 10 acts as a vertical extension of the runner and properly aligns the core panel 12 with the runner.

The tabs 36 and 37 define the end limits of the clip, and the distance between these end limits is substantially equal to the distance between the side pieces 20 and 22 of the ceiling runner 16. Thus, the clip will fit into the ceiling runner with the tabs 36 and 37 thereof extending substantially into engagement with the side pieces 20 and 22 of the runner, thereby effectively positioning the depending panel-engaging portions of the clip between the side pieces of the runner. Each panel 12 may be inserted between the runners 14, either before or after the clips are applied, by first raising it into the ceiling runner and then lowering it into the floor runner.

A slightly modified clip 40 is illustrated in FIG. 8. This clip is substantially channel-shaped and includes a flat base portion 42, a pair of parallel plates or legs 44 and 46 connected to and extending perpendicularly outward (upward) from said base portion, and a pair of substantially coplanar spacing elements or flanges 48 and 50. The flange 48 extends outwardly from the juncture of the leg 44 and the base portion 42, and the flange 50 extends outwardly in the opposite direction from the juncture of the leg 46 and the base portion. The flanges 48 and 50 are thus in the plane of the base in the clip illustrated in FIG. 8. The spacing between the distal ends of the flanges 48 and 50 is substantially equal to the spacing between the side pieces 20 and 22 of the floor runner 14, and the clip may thus be positioned accurately within the floor runner. For use as an extension clip in the ceiling runner, the legs 44 and 46 are preferably longer than the side pieces of the runner. Penetrating fasteners 52 may be employed to fasten the clip 40 in place, as illustrated in FIG. 8.

A slightly modified clip is illustrated in FIGS. 9, 10, and 11. This clip is adapted to be used at both the floor and ceiling and is constructed in such a manner that it may be used in connection with the construction of either a hollow or a solid non-load bearing partition system. The clip 54 has a substantially flat base portion 56 and a pair of parallel, planar legs of side pieces 58 and 60 which are connected to the opposite ends of the base and extend substantially perpendicularly upwardly therefrom. These legs, however, are not as long as the side pieces of the runner. Connected to the opposite end of leg 58 and extending perpendicularly outwardly therefrom is a spacing tab or flange 62. A corresponding space tab or flange 64 is connected to the end of the leg 60 and extends perpendicularly outward therefrom. Thus, the spacing tabs 62 and 64 define the end limits of the clip, and the spacing between the distal ends of these tabs is approximately equal to the spacing between the side pieces 20 and 22 of the runner 14.

As previously stated, the clip illustrated in FIG. 9 can be used in either a solid or a hollow non-load bearing wall partition system. In FIG. 10, the clip is shown being used in a hollow wall partition system wherein it accurately positions the end of a hollow metal stud member 66 within runner 14. For this purpose, the clip 54 is inserted between the side pieces 20 and 22 of the runner with the coplanar spacing tabs 62 and 64 thereof disposed flatly against the base 18 of the floor runner. The legs 58 and 60 and the base 56 of the clip will then protude upwardly into the hollow of the stud member 66. The spacing between the legs 58 and 60 of the clip are approximately equal to the inside dimension of the hollow stud member 66 and thus there is a snug interfitting engagement between the clip and the stud member. The ends of the tabs 62 and 64 are in close proximity with the side pieces 20 and 22 of the runner thus preventing any lateral movement of the stud or clip after the two have been interengaged. The runners 14 are, of course, adapted to accommodate facing layers 24 and 26 on opposite sides of the centrally disposed hollow stud member 66. These facing layers are merely raised into position on top of the tabs 62 and 64 of the clips at the floor between the stud 66 and the side pieces 20 and 22, respectively, of the floor runner.

In FIG. 11, the clip is shown used in a solid wall construction, and this is accomplished merely by inverting the clip so that the flat base 56 thereof is in engagement with the base 18 of the runner. The legs 58 and 60 of the clip thus will extend upwardly therefrom and the tabs 62 and 64 will extend outwardly therefrom into substantial engagement with the parallel side pieces 20 and 22 of the channel-shaped runner. The clip may be fixed in position by penetrating fasteners which extent through the base portion of the clip, the base of the runner, and into the underlying floor or overlying ceiling structure, as the case may be. The core panel 12 of the system is positioned within the hollow central portion of the clip formed by the base 56 and the two parallel upright legs 58 and 60. The facing layers 24 and 26 (not shown in FIG. 11) may then be placed on the floor clip tabs 62 and 64 which are spaced above and extend parallel to the base 18 of the floor runner. This provides space below the face layers for the accommodation of pipes and wires or the like.

The clip may be constructed with one of the tabs 62 slightly longer than the other tab 64, as illustrated in FIG. 12. This clip is preferably used with substantially wider floor and ceiling runners to produce a hollow partition, such as illustrated in FIG. 13, which is substantially thicker than that illustrated in FIG. 10. It may been seen that the protuberant portion of the clip, which as previously described, includes the base 56 and the upright legs 58 and 60, will be positioned on one side of the runner 14 when the clip is positioned therein. The spacing between the distal ends of the clip tabs 62 and 64 is still approximately equal to the spacing between the side pieces 20 and 22 of the runner, and thus the stud 66 will be positioned by the clip to one side within the runner. It will be noted that the clips are in relative staggered relationship with the longer tabs 62 disposed on opposite sides in the adjacent clips. This results in a corresponding staggering of the stud members 66, and each facing layer 24 and 26 is held in place between alternate similarly oriented stud members, as best illustrated in FIG. 13.

It may be seen that the device constructed in accordance with this invention is quite versatile and adapted to properly position the support members of a wall construction in such a manner that the facing layers may be quickly and easily affixed thereto. The core panels in a solid wall construction need not be accurately cut as was previously required, and clips will accurately position the core panels within the respective floor and ceiling runners preparatory to the application of the facing layers thereto. In the hollow wall construction, the hollow stud members are accurately aligned, and the wall is quickly and easily constructed.

Although the invention has been described with a certain degree of particularly, it is understood that the present disclosure has been made only by way of example and that modifications and changes in various details may be resorted to without departing from the spirit and scope of the invention, as hereinafter claimed.

What is claimed is:

1. In a wall construction having a plurality of core panels arranged in edge-to-edge relationship and a facing layer covering said panels, the novel combination of a channel-shaped runner having a substantially flat base and a pair of substantially parallel side pieces extending transversely therefrom, and a clip comprising a pair of elongated opposing end elements adapted to engage the opposing exterior side surfaces of one of the core panels adjacent one edge thereof, a transverse intermediate web joining said end elements and adapted to extend about the edge of the core panel, and a pair of substantially coplanar tabs each being connected transversely to a respective end element and fastened flatly to the flat base of said runner, whereby the panel may be properly fixed in spaced relationship with respect to both the base and the side pieces of said runner for the application of the facing layer thereto.

2. In a wall construction having a plurality of core panels arranged in edge-to-edge relationship and a facing layer covering said panels, the novel combination of a channel-shaped runner having a substantially flat base and a pair of substantially parallel side pieces extending transversely therefrom, and a clip comprising a pair of elongated opposing end elements adapted to engage the opposing exterior side surfaces of one of the core panels adjacent one edge thereof, the length of said end elements being greater than the depth of said runner side pieces, a transverse intermediate web joining said end elements and adapted to extend about the edge of the core panel, and a pair of substantially coplanar tabs each being connected transversely to a respective end element and fastened flatly to the flat base of said runner, the distance between the distal ends of said tabs being approximately equal to the spacing between the side pieces of said runner, whereby the panel may be properly fixed in spaced relationship with respect to both the base and the side pieces of said runner for the application of the facing layer thereto.

3. In a wall construction having a plurality of core panels arranged in edge-to-edge relationship and a facing layer covering said panels, the novel combination of a channel-shaped runner having a substantially flat base and a pair of substantially parallel side pieces extending transversely therefrom, and a clip comprising a pair of spaced substantially coplanar tabs, a pair of substantially parallel end plates each connected to and extending transversely from one of said tabs, the length of said end plates being greater than the depth of said runner side pieces, and said plates being spaced to accommodate a core panel therebetween, and a transverse connecting web joining said end plates and adapted to extend about the edge of the core panel, said web being spaced from the plane of said tabs, said tabs being flatly positioned against the base of said runner and having their distal ends in close proximity with the side pieces of said runner, whereby the panel may be properly fixed in spaced relationship with respect to both the base and the side pieces of said runner for the application of the facing layer thereto.

4. In a wall construction having a plurality of core panels arranged in edge-to-edge relationship and a facing layer covering said panels, the novel combination of a channel-shaped runner having a substantially flat base and a pair of substantially parallel side pieces extending transversely therefrom, and a clip comprising a pair of spaced substantially coplanar tabs, a pair of spaced end plates, each connected to and extending transversely from one of said tabs, and a transverse connecting web joining said end plates and adapted to extend about the edge of the core panel, said connecting web resiliently urging said end plates toward each other, whereby the panel may be gripped therebetween, said tabs being flatly positioned against the base of said runner and having their distal ends in close proximity with the side pieces of said runner, whereby the panel may be properly fixed in position within said runner for the application of the facing layer thereto.

5. In a wall construction having a plurality of core panels arranged in edge-to-edge relationship and a facing layer covering said panels, the novel combination of a channel-shaped runner having a substantially flat base and a pair of substantially parallel side pieces extending transversely therefrom, and a clip comprising a pair of spaced substantially coplanar tabs, a pair of substantially parallel end plates each connected to and extending transversely from one of said tabs, the length of said end plates being greater than the depth of said runner side pieces, and said end plates being spaced to accommodate a core panel therebetween, and a transverse connecting web joining said end elements and adapted to extend about the edge of the core panel, said web being spaced from the plane of said tabs and being shaped to closely follow the panel edge contour, said tabs being flatly positioned against the base of said runner and having their distal ends in close proximity with the side pieces of said runner, whereby the panel may be properly fixed in position within said runner for the application of the facing layer thereto.

6. In a wall construction having a plurality of core panels arranged in edge-to-edge relationship and a facing layer covering said panels, the novel combination of a channel-shaped runner having a substantially flat base and a pair of substantially parallel side pieces extending transversely therefrom, a clip comprising a pair of spaced substantially coplanar tabs, a pair of end plates each connected to and extending transversely from one of said tabs and being adapted to accommodate an end portion of a panel therebetween, the length of said end plates being greater than the depth of said runner side pieces, and a transverse connecting web joining said end plates and adapted to extend about the edge of the core panel, said tabs being flatly positioned against the base of said runner and having their distal ends in close proximity with the side pieces of said runner, whereby the panel may be properly fixed in position within said runner, said bottom runner being spaced from said top runner and having means mounted thereon for properly positioning the bottom of the panel therein.

7. In a wall construction, a substantially channel-shaped runner having a substantially flat base and a pair of substantially parallel side pieces extending transversely therefrom, and a clip adapted to fit transversely within said runner, said clip comprising a substantially flat base, the width of which is substantially less than the width of said runner base, a pair of flat substantially parallel legs extending normally from said base a distance less than the height of said runner side pieces, the spacing between said legs being substantially less than the spacing between the side pieces of said runner, and a pair of flat, substantially coplanar flanges each connected to and extending transversely outward from the respective legs, the distance between the outward extremities of said flanges being approximately equal to the spacing between the side pieces of said runner to properly position the legs and base of said clip from the side pieces of said runner, whereby said clip may be positioned within said runner either with the flanges thereof in engagement with the base of said runner so that a hollow stud may be mounted over the clip legs and base in the construction of a hollow wall or with the base thereof in engagement with the base of said runner so that a core panel may be received between said clip legs in the construction of a solid wall.

8. In a wall construction, a substantially channel-shaped runner having a substantially flat base and a pair of substantially parallel side pieces extending transversely therefrom, a hollow stud member extending transverse with respect to the base of said runner, the width of said stud member being substantially less than the width of said runner and one end thereof being disposed between the side pieces of said runner, and a clip having an interiorly disposed protuberant portion the width of which is substantially less than the width of said runner, said protuberant portion being snugly disposed within the hollow of said stud member, and a pair of spacing elements integral with said protuberant portion and extending outwardly in opposite directions therefrom to define the respective opposing end limits of said clip, the distance between said end limits being substantially equal to the spacing between the parallel side pieces of said runner, whereby said clip is effective to properly position the end of said hollow stud between the side pieces of said runner.

9. The structure recited in claim 8 wherein one of said spacing elements in said clip is longer than the other, whereby the stud member will be positioned thereby toward one side of said runner.

10. In a wall construction, a substantially channel-shaped runner having a substantially flat base and a pair of substantially parallel side pieces extending transversely therefrom, a plurality of core panels extending transverse with respect to the base of said runner and having one edge thereof disposed between the side pieces of said runner, and a clip comprising a pair of substantially parallel legs spaced to accommodate said panel edge, a substantially planar base in flat engagement with the base of said runner and extending transversely between and interconnecting said legs, and a pair of substantially coplanar positioning elements spaced from said base and integral with said legs and extending transversely outwardly therefrom in opposite directions to define the respective opposing end limits of said clip, the distance between said end limits being substantially equal to the spacing between the parallel side pieces of said runner, whereby said clip is effective to properly position the edge of one of said core panels betwten the side pieces of said runner.

11. A clip for holding a core unit in a predetermined spaced relationship with respect to a runner, said clip comprising a pair of elongated opposing end elements adapted to engage the opposing exterior side surfaces of the core unit adjacent one edge thereof to prevent relative transverse movement of said core panel with respect to said clip, an intermediate web joining said end members, said web comprising two substantially planar angularly disposed portions joined to each other and spanning the distance between said end members, whereby said web will extend transversely about the edge of the core unit to prevent relative parallel movement of said core panel with respect to said clip, and a pair of tabs each connected transversely to a respective end member and adapted to engage and be fastened to the runner.

References Cited in the file of this patent
UNITED STATES PATENTS

| | | |
|---|---|---|
| 2,097,484 | Winslow | Nov. 2, 1937 |
| 2,267,477 | Siebenlist | Dec. 23, 1941 |
| 2,350,093 | Braloff | May 30, 1944 |
| 2,904,991 | Vaughan et al. | Sept. 22, 1959 |
| 2,994,114 | Black | Aug. 1, 1961 |